Feb. 14, 1961  R. F. SEYFRIED  2,971,754
CONTROL OF HIGH FREQUENCY INDUCTION HEATING
Filed July 16, 1958

INVENTOR.
RICHARD F. SEYFRIED
BY
ATTORNEY

United States Patent Office 2,971,754
Patented Feb. 14, 1961

2,971,754
CONTROL OF HIGH FREQUENCY INDUCTION HEATING

Richard F. Seyfried, Cleveland, Ohio, assignor to The Ohio Crankshaft Company, Cleveland, Ohio, a corporation of Ohio Filed July 16, 1958, Ser. No. 749,018

3 Claims. (Cl. 266—5)

This invention pertains to the art of high frequency induction heating and more particularly to a method and apparatus for controlling the induction heating cycle.

Heretofore difficulty has been experienced in the art of induction heating wherein the amount of heat supplied to the work piece is critical with either over or under heating of the parts resulting in excessive amounts of scrap.

Such control of the heating cycle has heretofore been on a time basis, and in one installation, scrap in excess of about 7% of the hardened parts resulted.

The present invention contemplates apparatus and process for controlling the end point of the heating cycle which overcomes the above referred to difficulties and enables substantial reductions in the scrap produced.

In accordance with the present invention, a contact type watt meter is provided to deenergize the load when the power input at an instant to the load reaches a predetermined value and if necessary, to apply the quench.

The principal object of the invention is the provision of a new and improved high frequency induction heating apparatus which has a more accurate control of the heating cycle and eliminates the scrap heretofore produced.

Another object of the invention is the provision of a new and improved high frequency induction heating apparatus which terminates the heating cycle when the power input at an instant to the load reaches a predetermined value.

Another object of the invention is the provision of a new and improved high frequency induction heating apparatus having a contact type watt meter for terminating the heating cycle.

Figure 1:
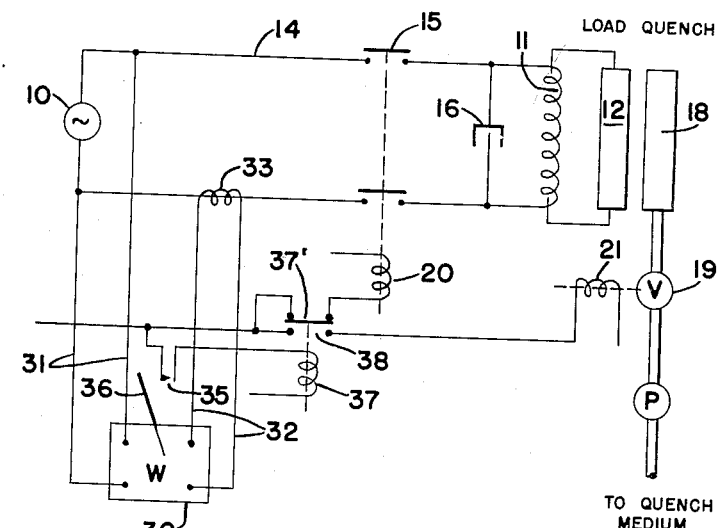
Figure 2:
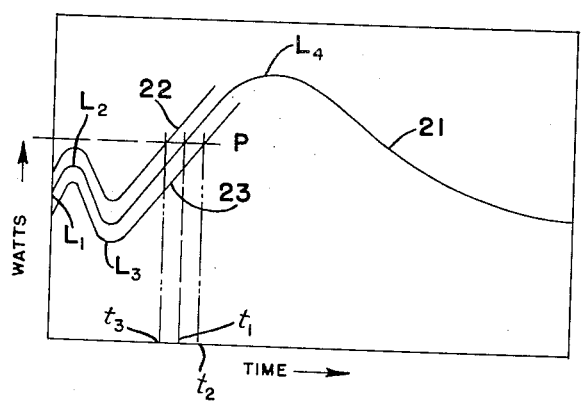

The invention may take physical form in certain parts and arrangements of parts, a preferred embodiment of which will be described in this specification and illustrated in the accompanying drawing which is a part hereof and wherein Figure 1 is a wiring diagram somewhat schematic of high frequency induction heating apparatus illustrating a preferred embodiment of the present invention; and Figure 2 is a chart showing a typical variation of the power supplied to an induction heating load in relation to time.

Referring now to the drawing wherein the showings are believed sufficient to enable one adequately skilled in the art to utilize the invention, the figures show a high frequency generator 10 connected to a high frequency coil 11 magnetically coupled to a load 12. The coil 11 is electrically connected to the generator 10 by means of power leads 14 and a main line contactor 15. A condensor 16 is connected in parallel with the coil 11 for compensating for the normally inductive load factor of the coil 11 on the generator 10.

A quench block 18 supplied with a quenching medium under pressure through a normally closed valve 19 is also provided.

All of the above is conventional in the high frequency induction heating art.

It will be noted that the main line contactors 15 have an operating coil 20 and the valve 19 has an operating coil 21.

Figure 2 shows a curve 21 illustrating the variation in the rate of power input being supplied to the load 12 with respect to time for a normal steel work piece. Thus when the contacts 15 are first closed, the rate of power input immediately assumes the value of $L_1$. It quickly climbs to the value of $L_2$, then falls to the value $L_3$ usually less than value $L_1$ and then climbs to a maximum value indicated by $L_4$. Thereafter the power input will gradually decrease until the load 12 reaches the melting temperature.

Heretofore it has been conventional to terminate a heating cycle at a predetermined time $t_1$ after the power is applied. The total heat supplied to the load is thus indicated by the area under the curve 21 to the left of the line $t_1$. As each work piece forming the load has the same weight and as the total power input is supposedly the same, they will each reach the same temperature.

However, due to various causes, for example, line voltage variations or variations in the electrical coupling of the inductor to the load due to variations in the diameter of the work piece, the rate of power input to the load 12 may vary from work piece to work piece or in the course of a day. Curve 21 shows the rate of power input for normal line voltage or a normal size work piece. Curve 22 shows the rate of power input for an increased line voltage or a larger diameter work piece. Curve 23 shows the rate of power input for a reduced line voltage or for an undersized work piece. As the power input to the load, and thus its ultimate temperature, is determined by the area under the rate of power input curve, it will be appreciated that these line voltage variations can produce substantial variations in the total amount of power supplied to each load piece and thus a variation in the final temperature if the heating cycle is terminated based on a predetermined time interval.

In accordance with the present invention, however, the heating cycle is terminated not based on a predetermined time interval, but when the power input at an instant to the load reaches a predetermined level indicated by the line P. Thus as will be seen from Figure 2, if the line voltage should decrease and the rate of power input to the work piece decrease, the time interval will be automatically lengthened, for example, to the time $t_2$ while if the line voltage should increase and thus the rate of power input to the load increase, the time interval will be reduced from the time interval $t_1$ to the time interval $t_3$. In the first case, the area under the curve tends to be automatically increased from that which would have been increased if the time interval $t_1$ has been employed to terminate the heating cycle and in the other case, the area will tend to be decreased from that which would have prevailed if the time period $t_1$ were employed. In either event, variations in the rate of power input inversely vary the actual time period of the heating so that the total heat supply to each work piece will be the same regardless of variations in the rate of power input.

In accordance with the invention, a contact type watt meter 30 is employed which watt meter has voltage connections 31 to the power leads 14 and current leads 32 to a current transformer 33. The watt meter also includes normally open contacts 35 which are closed when the armature 36 of the watt meter moves into engagement therewith. Closing of the contacts 35 energizes the control coil of a relay 37 which opens contact 37' in series with the actuating coil 20 of the main line contactor 15. Thus the heating cycle is terminated at a predetermined point depending upon the power input at an instant to the load. At the same time, the contacts 37' are open, the contacts 38 are closed, which energizes the coil 21 of the valve 19 opening this valve and allowing a quenching medium to be projected from the quench block 18 on the load 12.

Obviously various other circuit elements may be provided to maintain the quench for a predetermined period of time or for recycling the operation, or both.

It is believed that the apparatus has been described in sufficient detail to enable one skilled in the art to utilize the invention.

Obviously, modifications and alterations will occur to others upon a reading and understanding the specification, and it is my intention to include such modifications and alterations insofar as they come within the scope of the appended claims.

Having thus described my invention, I claim:

1. In a high frequency induction heating apparatus including a high frequency power source, a load and contactors for controlling the energization of the load, means for closing the contactors to start a heating cycle and means for opening the contactors to terminate a heating cycle, the improvement which comprises said last-mentioned means being comprised of a watt meter actuated by the power input at an instant to the load, means on said watt meter associated with said contactors for opening same when the power input at an instant to the load reaches a predetermined value, and thus terminating a heating cycle, quenching means for discharging quench fluid onto the load, and means operated by said watt meter for initiating the operation of said quenching means to discharge quench fluid onto the load when the power input at an instant to the load reaches said predetermined value.

2. In induction heating apparatus including a power source, a load circuit which, when coupled to said power source, draws power from said source which first increases to a temporary peak value and then decreases below said temporary peak value and then increases above said peak value, and contactors connected between said power source and said load circuit, said contactors being closed to couple the power source to the load circuit and thereby start the induction heating cycle, the improvement which comprises means for sensing the power at an instant applied to said load circuit, and means operated by said sensing means and preset to open said contactors when said power at an instant reaches a predetermined value higher than said temporary peak value to thereby terminate the induction heating cycle.

3. The apparatus of claim 2 wherein there are provided quenching means arranged to discharge quench fluid onto the induction heating load, and means for operating said quenching means to discharge the quench fluid when said power at an instant reaches said predetermined value.

References Cited in the file of this patent

UNITED STATES PATENTS

| 1,230,357 | Woodrow | June 19, 1917 |
| 1,288,589 | Hood | Dec. 24, 1918 |
| 2,381,310 | Richter | Aug. 7, 1945 |
| 2,510,770 | Bohn | June 6, 1950 |

FOREIGN PATENTS

| 615,150 | Great Britain | Jan. 3, 1949 |